United States Patent [19]
Baumeister

[11] Patent Number: 4,591,930
[45] Date of Patent: May 27, 1986

[54] SIGNAL PROCESSING FOR HIGH RESOLUTION ELECTRONIC STILL CAMERA

[75] Inventor: Hans-Peter Baumeister, Churchville, N.Y.

[73] Assignee: Eastman Kodak Company, Rochester, N.Y.

[21] Appl. No.: 535,447

[22] Filed: Sep. 23, 1983

[51] Int. Cl.$^4$ ............................................. H04N 5/92
[52] U.S. Cl. ................................... 360/35.1; 360/30; 360/33.1; 360/66; 358/335; 358/340
[58] Field of Search ...................... 358/340, 330, 335; 360/30, 29, 35.1, 33.1, 66

[56] References Cited

U.S. PATENT DOCUMENTS

| | | | |
|---|---|---|---|
| 2,956,114 | 10/1960 | Ginsburg | 360/30 |
| 3,084,224 | 4/1963 | Sanford | 360/30 |
| 3,402,256 | 9/1968 | Kinjo | 360/30 |
| 3,999,218 | 12/1976 | Iyama | 360/35.1 |

Primary Examiner—Alan Faber
Attorney, Agent, or Firm—Robert F. Cody

[57] ABSTRACT

In an effort to provide exceptionally high resolution playback of video information recorded in the environment of an electronic still camera, the invention calls for:

(a) Use of double side band FM recording, which in the prior art would have been productive of playback interference between the side bands of harmonics and the side bands of corresponding fundamentals unless the relative head-to-media speed was high enough to accommodate high carrier frequencies.

(b) Bias recording such FM video information, thereby to prevent the inherent production of harmonic information within the media.

(c) Up-converting the harmonic-free playback signal, before the harmonic-causing procedure of amplitude-limiting such playback signal, thereby to cause such signal to have a spectrum-wise wide disparity between the modulated fundamental in question and its harmonics, as caused by such amplitude limiting.

(d) Removing the generated harmonics (and their side bands) prior to or during demodulation of the modulated fundamental.

9 Claims, 5 Drawing Figures

SIGNAL PROCESSING FOR HIGH RESOLUTION ELECTRONIC STILL CAMERA

BACKGROUND OF THE INVENTION

Field of the Invention

This invention relates to video technology and, more importantly, to a technique for use in magnetic recording apparatus employed in connection with electronic still photography.

The invention as well as the prior art will be described in connection with the figures, of which FIG. 1 is a diagram illustrating a set of curves useful in describing the invention, FIGS. 2a and 2b are spectrum-diagrams useful in illustrating the state of the art that existed prior to the invention, FIG. 3 is a schematic block diagram of apparatus according to a presently preferred form of the invention, and FIG. 4 is a spectrum-diagram useful in describing the workings of the apparatus of FIG. 3.

DESCRIPTION RELATIVE TO THE PRIOR ART

In the magnetic recording of encoded video information, it was recognized early that, because of irregularities and the like within recording media, and because of media surface smoothness considerations etc., frequency modulation (or some other form of angle modulation), as opposed to amplitude modulation, would be the preferable way to encode such information. Any non-linearity within the record or playback channels, however, is productive of harmonics; and, so, when (as was considered necessary) both side bands of a frequency modulated video carrier were recorded/played back, the resultant video display became unacceptable due to interference between the side bands of harmonics and the side bands of the modulated fundamental signal which was recorded. (As is known, it is conventional to limit amplitude excursions of the playback frequency modulated signal, a non-linear process known for its production of harmonics.) Certainly, one way to avoid the aforenoted harmonic distortion is to employ a high carrier frequency for the video information, whereby harmonics become so separated spectrum-wise from their fundamental that their side bands inherently get precluded from interference with the fundamental. What militates against this technique, however, is the fact that the recording media can record wavelengths which are just so small; and, for a recording media to record higher and higher frequencies (i.e. smaller and smaller wavelengths), the relative head-to-media speed must be increased to higher and higher speeds. Needless to say, this weighed heavily on the development of the video recording technology: to record with a low carrier frequency meant poor playback quality; to record with a high carrier frequency meant a high relative head-to-media speed, and its attendant excessive media consumption rate.

Ginsburg et al in the mid 1950's (U.S. Pat. No. 2,956,114) made what was a basic discovery in the recording of video information, viz. that the upper side band was unnecessary for a fairly good display corresponding to such information. Attendantly, Ginsburg et al (using what was called narrow band FM, viz. frequency modulation at a modulation index less than one) shifted their carrier frequency sufficiently high that, at an acceptable relative head-to-media speed, only the lower side band was fully recorded, with the upper side band, more or less, being essentially non-recorded (single, or vestigial, side band recording). As a result, Ginsburg et al attained fairly good playback quality at a tolerable media consumption rate; and it was this discovery that, to a great extent, gave rise to the development of the video recording technology.

FIG. 1, curve a, depicts a typical response curve (bias recording) for the playback of magnetically recorded information. Ideally, it would be desirable to operate in the region 1 thereof so as to optimize playback. By operating at a carrier frequency within the region 2 of curve a however—as was required in order to employ the Ginsburg discovery—a certain level of playback signal was lost, albeit that the attained playback was acceptable. To compensate for this loss-producing requirement, current practice is to saturation-record (curve b, FIG. 1) video information that is frequency modulated according to Ginsburg et al. Admittedly, saturation recording, by its very nature, is highly productive of harmonics; but by utilizing a sufficiently high carrier, as taught by Ginsburg et al, such harmonics were found to have little or no adverse effect.

For the Ginsburg et al technique to be employed in connection with scenes in which motion therewithin causes successive video fields to be just a bit different from each other, there is no problem, the integrating capability of the human eye serving to indicate "motion" from field-to-field scene differences. Should certain fine detail be lost because of the absence of the upper side band, such may be tolerated for the reason that each motion scene is inherently transitory in nature. In the case, however, of high quality still frame video, as would occur in connection with electronic still photography, the Ginsburg et al strategy is lacking: good reproduction of fine detail associated with the upper side band, while clearly important to a video still frame display, is even more important to the production of photographic prints corresponding to such still frame display, since photographic emulsions are known to be capable of greater image resolution than video display equipment.

SUMMARY OF THE INVENTION

In an effort to provide exceptionally high resolution playback of video information recorded in the environment of an electronic still camera, the invention calls for:

(a) Use of double side band FM recording, which in the prior art would have been productive of playback interference between the side bands of harmonics and the side bands of corresponding fundamentals unless the relative heat-to-media speed was high enough to accommodate high carrier frequencies.

(b) Bias recording such FM video information, thereby to prevent the inherent production of harmonic information within the media. (Procedures a and b hereof, in effect, desirably work together to shift record/playback operation to region 1 of curve a, FIG. 1.)

(c) Up-converting the harmonic-free playback signal, before the harmonic-causing procedure of amplitude-limiting such playback signal, thereby to cause such signal to have a spectrum-wise wide disparity between the modulated fundamental in question and its harmonics, as caused by such amplitude limiting.

(d) Removing the generated harmonics (and their side bands) prior to or during demodulation of the modulated fundamental.

As noted above, the highest frequency (shortest wavelength) that can be magnetically recorded/played back depends of the relative speed between media and head. In the case of an electronic still camera in which the recording media is in the form of a magnetic disc, this means that the radius of the innermost recording track (slowest lineal speed) of the disc is controlling as to the uppermost recoverable frequency. By employing inventive procedures a and b as described above, therefore, the radius of the innermost recording track may be made smaller than otherwise; and, attendantly, the camera in question may, if desired, be made smaller and more compact.

DETAILED DESCRIPTION

Figure 2A:
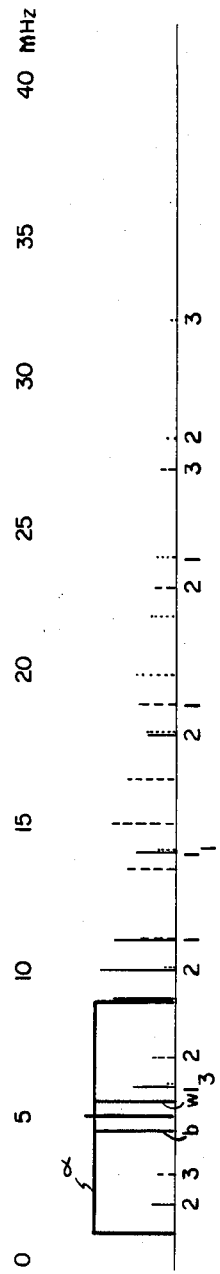

FIG. 2a is presented in an effort to explain the state of the art that confronted Ginsburg et al at the time of their invention: Given that the recording media at the selected media-to-head speed is capable of recording information to, say, 11 MHz, an information spectrum $\alpha$ could clearly be recorded within the recording media; i.e. with a deviation of 1 MHz corresponding to "black" (b) to "white" (w) video transitions, (principal) side bands to 1 and 9 MHz would get recorded, assuming a video bandwidth of say 4 MHz. As a result of the aforementioned amplitude-limiting which is employed during playback—and other non-linear signal handling, such as saturation recording—harmonics (and side bands thereof) of the recorded carrier are produced. To be noted is the fact that side bands of such harmonics fall within the information spectrum $\alpha$; and it is the energy of these overlapping side bands which would appear (absent some corrective scheme) as artifacts within the display corresponding to the information spectrum $\alpha$.

Figure 2B:
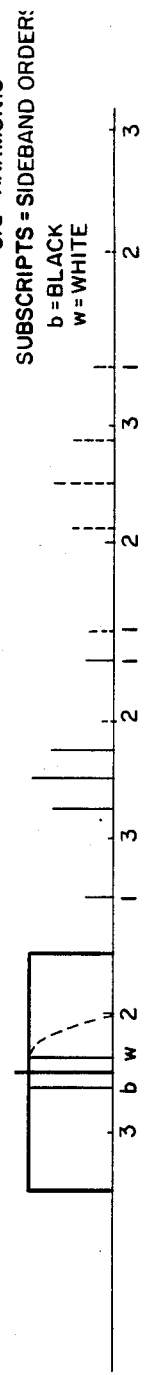

Ginsburg et al, by employing a carrier (FIG. 2b) at, or near, the recording limit of the media (in this example, at 11 MHz) suffered the loss of their upper side band; but, due to non-linear signal processing (e.g. saturation recording; amplitude limiting during playback) side bands of harmonics so produced only minimally extend into the information spectrum. As a result, playback by the Ginsburg et al technique is essentially artifact-free, albeit that a fair amount of image quality is lost by not retaining the upper side band during the recording operation.

Figure 1:
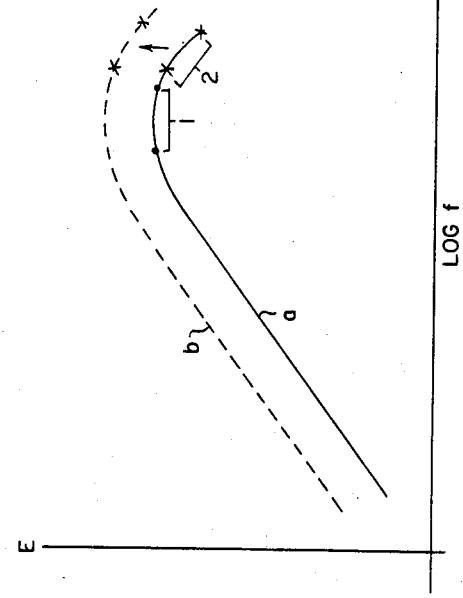
Figure 3:
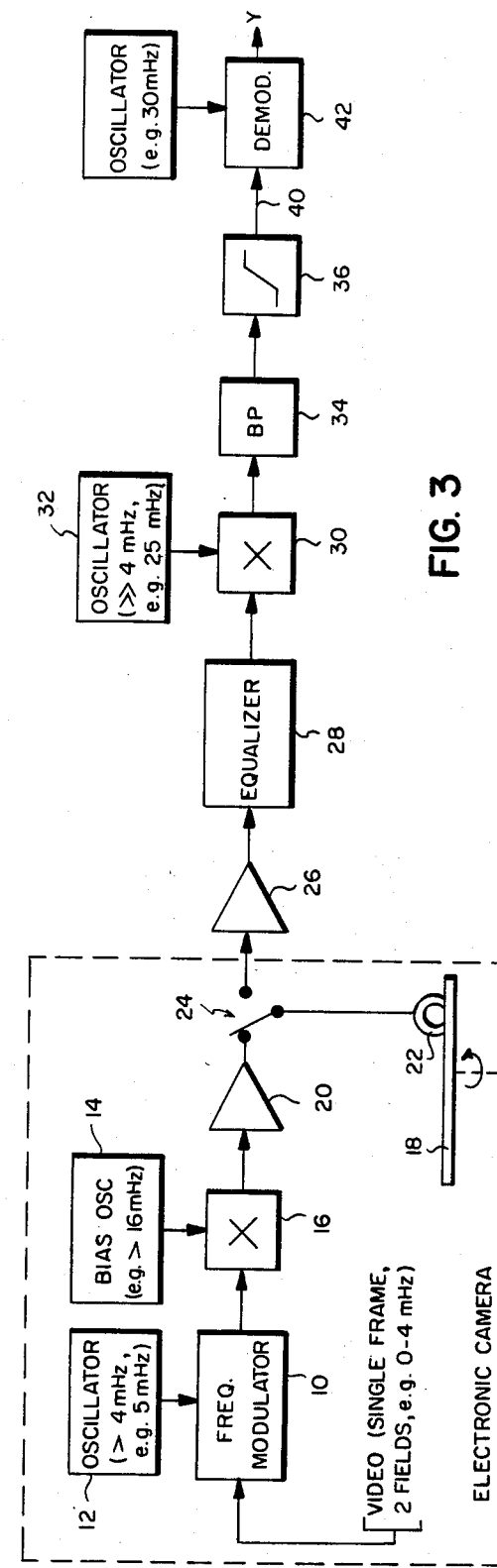
Figure 4:
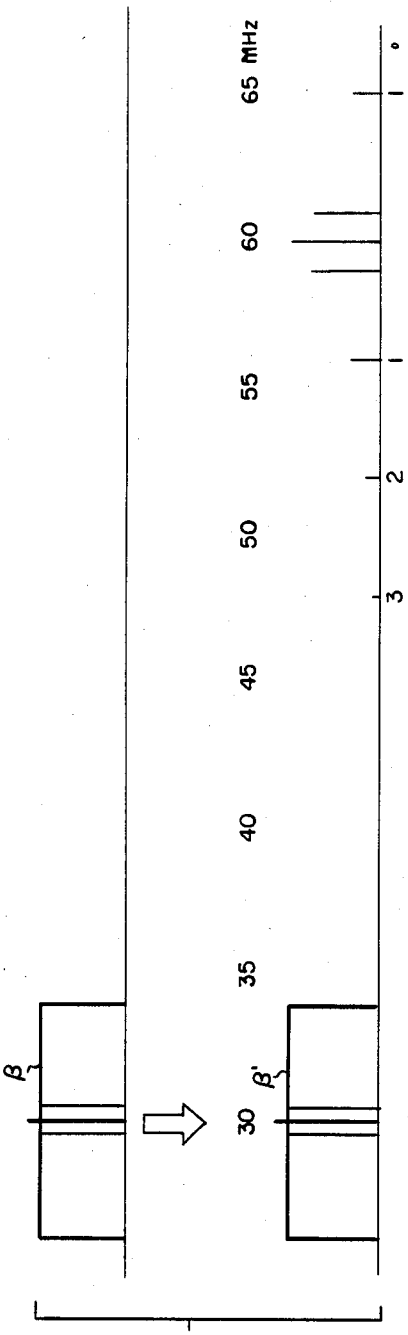

Reference should now be had to FIG. 3: A high resolution video signal corresponding to an electronic photographic snap-shot is applied to a frequency modulator 10, and modulated onto a carrier (oscillator 12) of, say, 5 MHz. The modulated video signal is then bias-recorded (oscillator 14; mixer 16) onto a rotary magnetic disc 18 via record electronics 20 and a magnetic head 22. As noted above, any signal loss associated with bias recording is effectively compensated for by the fact that recording takes place, desirably, at the peak region 1 of curve a, FIG. 1. Also, as a by-product of "region 1" recording (i.e. lower record frequency) the disc 18 may (desirably) be of smaller radius than otherwise. Because the video signal is bias-recorded—as opposed to saturation recorded—there are no distorting harmonics and side bands thereof inherently available to corrupt the frequency modulated video signal. See FIG. 4, the information spectrum $\beta$ having a center frequency of 5 MHz.

For playback, a record/playback switch 24 is toggled causing signals produced by the head 22 to be applied via electronics 26, through a equalizer 28, to a mixer 30. The mixer 30 receives a 25 MHz signal from an oscillator 32, and thereby up-converts the information spectrum $\beta$ (center frequency 5 MHz) so that it has a center frequency of 30 MHz (information spectrum $\beta'$) ... still without the distorting influence of the side bands of harmonics.

A band pass filter 34 is employed to separate out the unwanted products of the mixer 30; and only then is the up-converted signal subjected to the harmonic-producing procedure of amplitude-limiting (36) the excursions of the frequency modulated video signal. Note that if, as taught herein, the up-conversion occurs prior to any harmonic-producing procedure, the side bands of harmonics which are produced are spectrum-wise quite a bit separated from the information spectrum ($\beta'$). Attendantly, a low pass filter may be employed at 40 to isolate the distortion-free information spectrum $\beta'$; or, as is preferred, the information spectrum may be directly demodulated (42) in its up-converted phase, such procedure having the effect of indirectly performing the low-pass filtering operation.

THE TECHNICAL ADVANCE

By virtue of the invention, a high resolution image (as is required for electronic still photography) may be produced, without artifacts, utilizing a recording disc of minimal radial dimension.

The invention has been described in detail with particular reference to certain preferred embodiments thereof, but it will be understood that variations and modifications can be effected within the spirit and scope of the invention.

What is claimed is:

1. Magnetic recording playback apparatus comprising:
   (a) means for producing a bias-recorded frequency modulated video signal comprised of the lower side band and all or substantially all of the upper side band of such signal, the bias of such bias-recorded signal being substantially uniform as a function of frequency
   (b) means for receiving and linearly processing said signal,
   (c) means for limiting amplitude excursions of signals applied thereto,
   (d) means for receiving and up-converting said linearly processed double side band frequency modulated signal, and for applying said up-converted frequency modulated signal to said means for limiting, the amount of up-conversion provided by said means for up-converting being sufficient to provide spectrum-wise disparity between the side bands of harmonics caused by said means for limiting and the spectrum of said up-converted frequency modulated signal, and
   (e) means for filtering away the side bands of said harmonics.

2. Apparatus of claim 1 further comprising a rotary magnetic disc having bias recorded thereon, in a generally circular track, a double side band frequency modulated video signal corresponding to a still photographic image.

3. Apparatus of claim 1 wherein said means for filtering is a demodulator for detecting the information contained within said up-converted frequency modulated signal.

4. Electronic apparatus for producing a substantially distortion-free signal corresponding to a still image comprising
   (a) a magnetic disc having at least one generally circular recording track on which there is a bias recorded double side band frequency modulated video signal corresponding to a photographic still image, said double side band signal being comprised of the lower side band and all or substantially all of said upper side band of said signal, and said bias being substantially uniform as a function of frequency
   (b) playback circuit means for reproducing and linearly processing the signal recorded on said disc,
   (c) means for receiving and frequency translating said reproduced signal and
   (d) limiter means for receiving the output of said frequency translating means for amplitude limiting signals applied to said limiter means, said limiter means by operation thereof serving to produce a desired frequency modulated amplitude-limited signal and undesired frequency modulated harmonics thereof,
   said frequency translating means being of a form that so frequency translates signals applied thereto that the side bands of undesired harmonics produced by operation of said limiter means are spectrum-wise separated significantly from the spectrum of said desired frequency modulated amplitude-limited signal, and
   (e) means for isolating and detecting the information content of said desired frequency modulated amplitude-limited signal.

5. The apparatus of claim 4 wherein said means for isolating and detecting is an FM demodulator.

6. A system for recording and reproducing a signal corresponding to an electronic still photographic image comprising
   (a) means for producing a double side band frequency modulated signal corresponding to said image,
   (b) a rotary magnetic recording disc,
   (c) means for bias recording in a circular track on said disc said frequency modulated signal, the bias therefor being substantially uniform as a function of frequency
   (d) means for reproducing and linearly processing the signal recorded on said disc,
   (e) means for limiting amplitude excursions of signals applied thereto,
   (f) means for receiving and up-converting said linearly processed double side band frequency modulated signal, and for applying said up-converted frequency modulated signal to said means for limiting, the amount of up conversion provided by said means for up-converting being sufficient to provide spectrum-wise disparity between the side bands of harmonics caused by said means for limiting and the spectrum of said up-converted frequency modulated signal, and
   (g) means for filtering away the side bands of said harmonics.

7. The apparatus of claim 6 wherein said means for filtering is a demodulator for detecting the information contained within said up-converted frequency modulated signal.

8. A system for recording and reproducing a signal corresponding to an electronic still photographic image comprising
   (a) means for producing a double side band frequency modulated signal corresponding to said image,
   (b) a rotary magnetic recording disc,
   (c) means for bias recording in a circular track on said disc said frequency modulated signal, the bias therefor being substantially uniform as a function of frequency
   (d) means for reproducing and linearly processing the signal recorded on said disc,
   (e) playback circuit means for reproducing and linearly processing the signal recorded on said disc,
   (f) means for receiving and frequency translating said reproduced signal,
   (g) limiter means for receiving the output of said frequency translating means for amplitude limiting signals applied thereto, said limiter means by operation thereof serving to produce a desired frequency modulated amplitude-limited signal and undesired frequency modulated harmonics thereof, said frequency translating means being of a form that so frequency translates signals applied thereto that the side bands of undesired harmonics produced by operation of said limiter means are spectrum-wise separated significantly from the spectrum of said desired frequency modulated amplitude-limited signal, and
   (h) means for isolating and detecting the information content of said desired frequency modulated amplitude-limited signal.

9. The apparatus of claim 8 wherein said means for isolating and detecting is an FM demodulator.

* * * * *